United States Patent [19]

Pipon et al.

[11] Patent Number: 4,770,464
[45] Date of Patent: Sep. 13, 1988

[54] ARTICULATION MEMBERS FOR BACK PORTION OF VEHICLE SEATS

[75] Inventors: Yves Pipon; Georges Droulon, both of Flers, France

[73] Assignee: A & M Cousin Etablissements Cousin Freres, Orne, France

[21] Appl. No.: 59,710

[22] Filed: Jun. 8, 1987

[30] Foreign Application Priority Data

Jun. 6, 1986 [FR] France .................. 86 08211

[51] Int. Cl.$^4$ .............................. A47C 1/00
[52] U.S. Cl. .................... 297/367; 297/363
[58] Field of Search ............ 297/367, 366, 363, 364, 297/365

[56] References Cited

U.S. PATENT DOCUMENTS

| | | | |
|---|---|---|---|
| 3,737,946 | 6/1973 | Giuliani | 297/367 X |
| 3,879,802 | 4/1975 | Werner | 297/367 X |
| 4,348,050 | 9/1982 | Letournoux et al. | 297/367 |

FOREIGN PATENT DOCUMENTS

| | | | |
|---|---|---|---|
| 2364754 | 8/1974 | Fed. Rep. of Germany | 297/367 |
| 2578602 | 9/1986 | France | 297/367 |

Primary Examiner—Francis K. Zugel
Attorney, Agent, or Firm—Browdy and Neimark

[57] ABSTRACT

The articulation member comprises asymetrically guided bearing plates. A fixed flange is shaped in order to support, by means of sectors, sliding bearing plates having an upper toothing pitch corresponding to pitch of a toothing of a movable flange. The bearing plates are normally pushed back from the toothing by elastic means and have positions which are angularly shifted for two of them and submitted to bias of control means such as a cam. An angular shift of two of the bearing plates is of $120° - \alpha/3$ $(=240° - \frac{2}{3}\alpha)$ with for complement $120° + \frac{2}{3}\alpha$, $\alpha$ being an angle forming a pitch for each tooth of the toothed ring and teeth of the bearing plates.

4 Claims, 4 Drawing Sheets

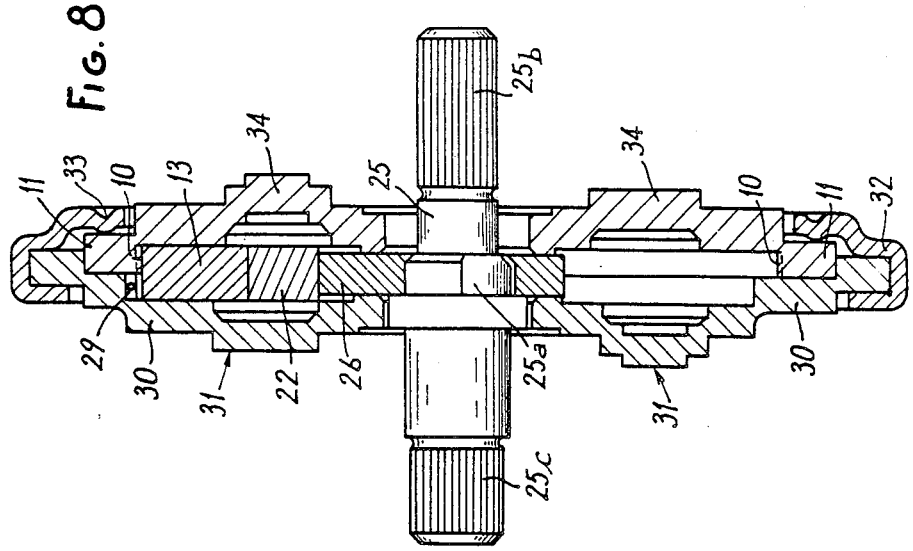
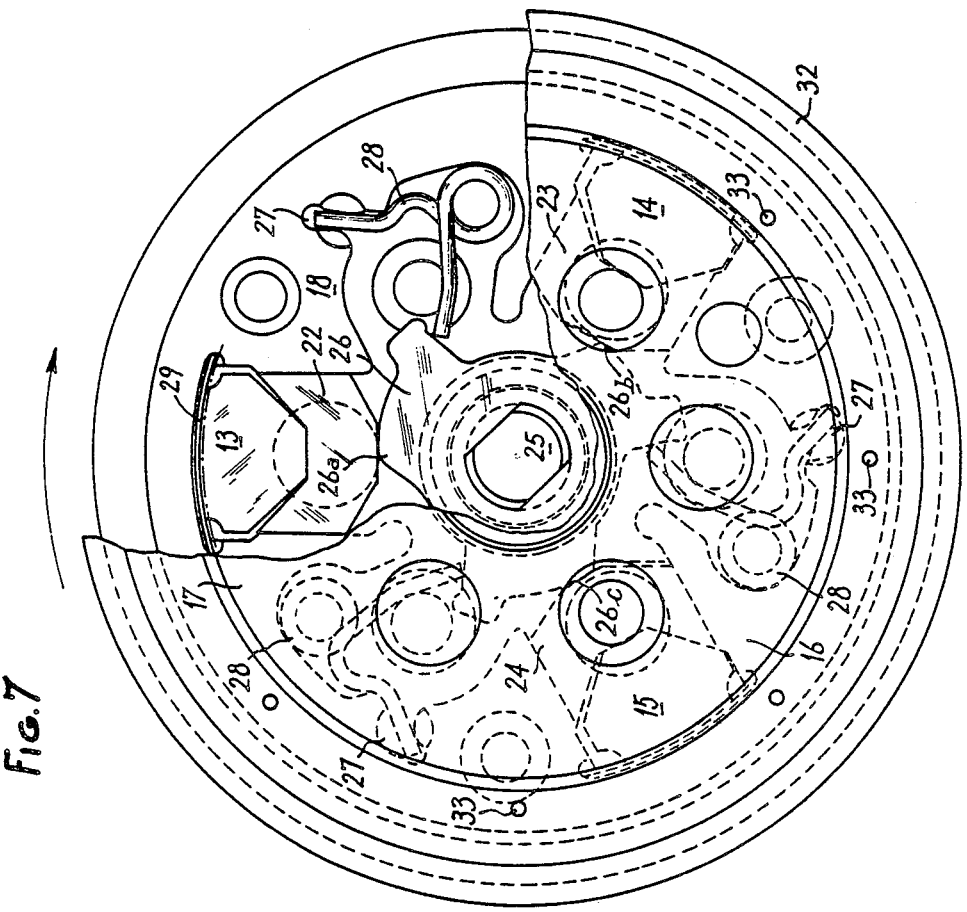

ARTICULATION MEMBERS FOR BACK PORTION OF VEHICLE SEATS

The present invention relates to articulation members for the back portion of a vehicle seat and similar applications and comprise asymetrically guided bearing plates.

BACKGROUND OF THE INVENTION

It is well known that bearing plates facilitate an increase of the number of adjusting angular positions of the back portion of a seat with respect to the seating portion of the seat, particularly when the fixed toothing of the movable ring and the toothing of the bearing plates are both very small.

However the known articulartion members have various drawbacks, and particularly rather important plays because of the manufacture of the parts, which results in an angular displacement of the back portion which is bad for the comfort of the seat user.

These known articulation members which position the back portion with respect to the seating portion are based on a positioning of the bearing plates in such a manner that teeth which are made on the toothed ring and on the toothed bearing plates are placed opposite the one from the other with a shift of an angle equal to that of a tooth. It is therefore impossible or at least not very possible, by using these articulation members to compensate the plays and, moreover, the minimum angle between two positions of the back portion is equal to the angular pitch of one tooth.

OBJECTS OF THE INVENTION

The present invention remedies to the above drawbacks by providing an articulation member enabling a greater number of locking positions relatively to the number of teeth made on the fixed locking ring by using a minimum of three bearing plates and by an angular shift with a certain magnitude for two of the bearing members with respect to the third one, when three bearing plates are used enabling a penetration of the teeth of one of the bearing plates at the teeth bottom of the locking ring and a partial penetration of the two other bearing plates in the locking ring causing thereby a locking without any play of the articulation member in any position with a very small angular shift which is substantially equal to one third of the angular pitch of each tooth of the locking ring.

This invention enables also to make the toothing of the locking ring and that of the bearing plates by a process which is very fast and of a low cost since the angle of each tooth is sufficient for enabling to use a manufacturing process of a great efficiency. Actually, the minimum, the angular displacement is equal to one third of the angular pitch ($\alpha$) of each tooth because the articulation members comprise always a minimum of three bearing plates so placed for covering the 360° of the periphery, which corresponds, in the case of three bearing plates to positions at $120° - \frac{2}{3}/3$ ; $120° + \frac{2}{3}\alpha$; $120° - \alpha/3$.

SUMMARY OF THE INVENTION

According to the invention, the articulation member for a back seat portion of a vehicle seat and similar applications comprises: three asymetrically guided sliding bearing plates having an upper toothing of a pitch $\alpha$; a fixed flange comprising three sectors for supporting the bearing plates; a movable flange having an inner toothing of a pitch $\alpha$, a pitch corresponding to the pitch $\alpha$ of the upper toothing of the bearing plates; elastic means for normally pushing back the bearing plates from the movable flange; the bearing plates being angularly shifted for two of the bearing plates and being submitted to a bias of control means, wherein the angular shift of the two of the bearing plates with respect to a third one is of $120° - \alpha/3$, whereby at least one of the bearing plates is at tooth-bottom in the inner toothing while other bearing plates will bear at least in part on opposed surfaces of the inner toothing by thus ensuring a locking of the articulation member, and therefore of the backing portion of the seat with respect to the seating portion of the seat.

According to another feature of the invention, each of the bearing plates have guiding extension having an upper part with a widened area, the fixed flange being provided with sector members each having a recessed area, the widened areas cooperating with the recessed area.

Several other features of the invention will become more apparent from the following description.

BRIEF DESCRIPTION OF THE DRAWINGS

Embodiments of the invention are shown by way of non limiting examples in the accompanying drawings, wherein:

FIG. 7 is a side elevation view, partly in cross-section, of the articulation member of FIGS. 5 and 6; and FIG. 8 is a diametral cross-section of the articulation member of FIG. 7.

DETAILED DESCRIPTION OF THE INVENTION

Figure 1:
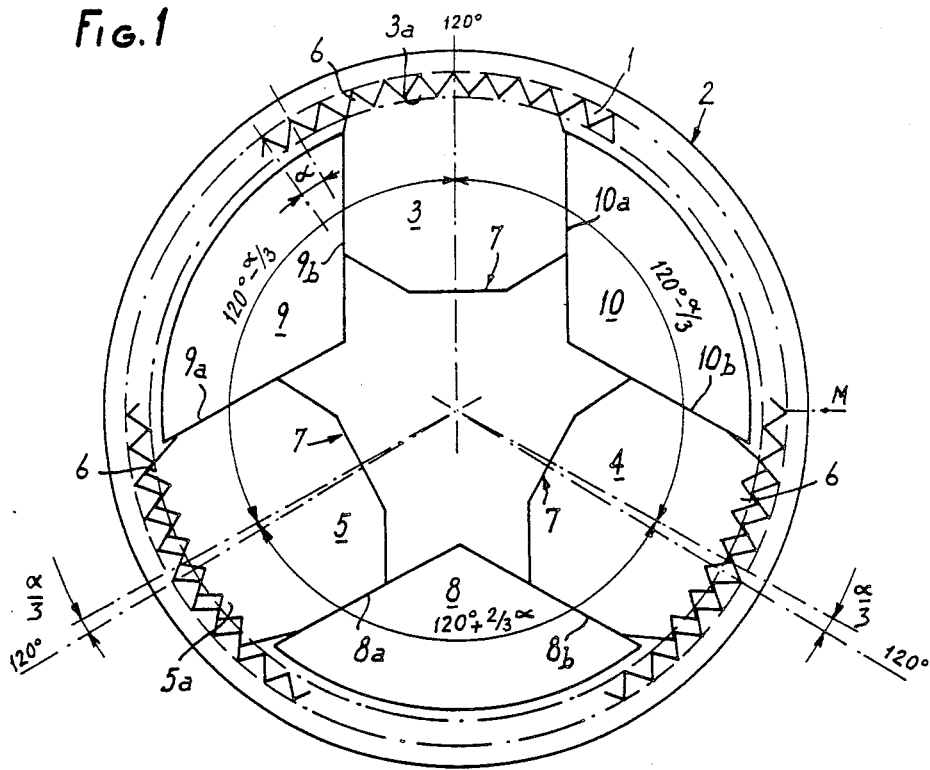
FIG. 1 is a diagrammatic front view of a three bearing plate articulation member according to the invention.

Referring now to the drawings, FIG. 1 diagrammatically shows a toothed ring 1 made by stamping or fine cutting on the movable flange 2 of an articulation member of the backing portion of a vehicle seat.

As this is shown, the teeth of the toothed ring 1 are spaced apart by a center angle $\alpha$ (pitch of a tooth), and three bearing plates 3, 4 and 5 are positioned within the toothed ring 1. The bearing plates 3, 4, 5 have each a subtantially squared shape and have, at their upper ends 3a, 4a, 5a, a toothing 6 having exactly the same angle $\alpha$ as the toothing of the ring 1.

The rear part of each of the bearing plates 3, 4, 5 has a central surface 7 which cooperates with a control member which is typically a cam. The bearing plates 3, 4, 5 are guided in the fixed flange, not shown but having three sector members 8, 9 10 fixed with the fixed part of the articulation forming, by their converging sides 8a, 8b, 9a, 9b, 10a, 10b, guiding members for the bearing plates 3, 4, 5.

However, by construction of both the sector members 8, 9, 10 and the bearing plates 3, 4, 5, the bearing plates 4 and 5 are each placed at 120°−α/3 with respect to the bearing plate 3. Therefore, when the three bearing plates 3, 4, 5 are pushed back by the control member mentioned above toward the toothed ring 1 of the movable flange 2, the toothing 6 of the bearing plate 3 will penetrate at tooth-bottom into the toothed ring 1; but the toothings 6 of the bearing plate 4, 5 will bear on the edges of the toothing of the ring 1 and do not penetrate at tooth-bottom.

There is thus obtained a perfect wedging of the articulation members since the plays are compensated by a sufficient penetration of the toothing 6 of the bearing plates 4, 5 in the teeth of the toothed ring 1.

If it is desired to adjust the back portion of the seat by a very small angular magnitude and if the bearing plates 3, 4, 5 are unlocked, the bearing plates 3, 4, 5 will move back and the teeth 6 will disengage the toothing of the ring 1 by freeing thus the back portion with respect to the seating portion.

Figure 2:
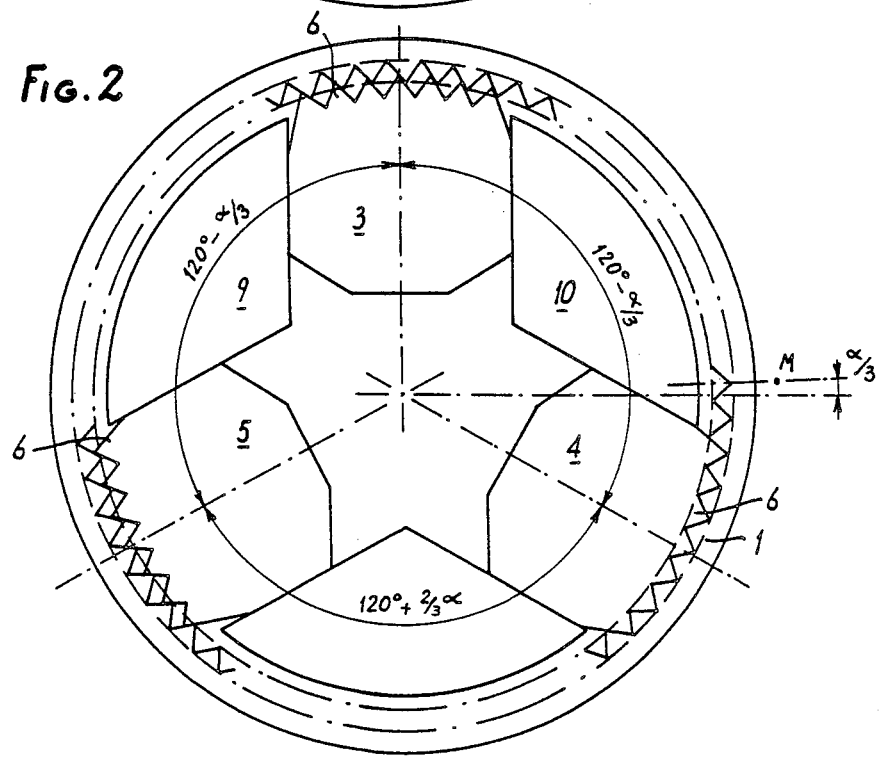
FIG. 2 is a view corresponding to that of FIG. 1 but rotated by an angle equal to one third of the angular pitch of a tooth.

By making an angular shift equal to ⅓ of the pitch α of one tooth, and thus an angular shift which is equal to α/3, the bearing plate 4 is then brought at tooth-bottom (see FIG. 2). The toothing 6 of the bearing plate 4 will thus penetrate fully into the tooth-bottom of the toothed ring 1 while the toothing 6 of the bearing plates 3 and 5 are locked on the tooth edges of the toothed ring 1. There is thus obtained a perfect and without play locking of the backing portion of a seat with respect to the seating portion of the seat, as this has been explained in the above disclosure.

It is thus found that the minimum displacement angle of the back portion with respect to the seating portion can be equal to α/3 which is to say equal to ⅓ of the angular pitch of a tooth of the toothed ring 1. If the angle α is small, and say within the range of 2°, there is thus obtained an angular sensitivity of about 40 minutes which was not possible till now.

The embodiment of FIGS. 1 and 2 gives a very great angular sensitivity but, as this has been explained in the above disclosure, the toothings of two of the bearing members will bear only on a part of the toothing 1 of the toothed ring.

Figure 3:
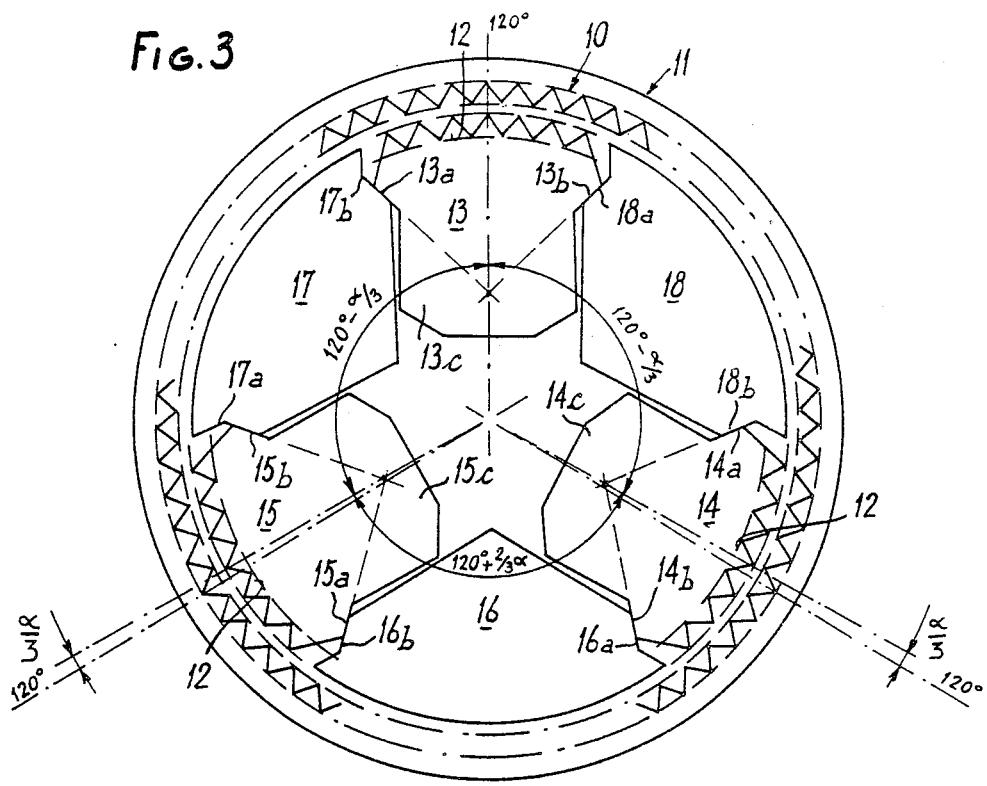
FIG. 3 is a variant of embodiment of the articulation member of FIGS. 1 and 2, the bearing members being disengaged from the fixed toothed ring and having a self centered guiding.
Figure 4:
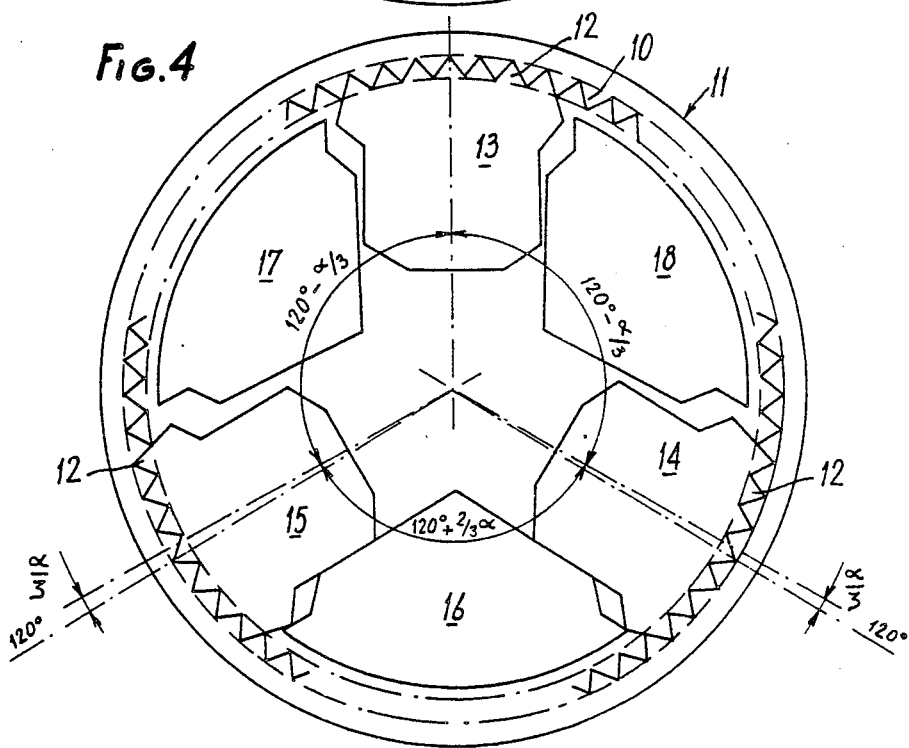
FIG. 4 is a view corresponding to that of FIG. 3 but with the bearing plates being shown engaged in the fixed tooth ring.

It results therefrom that it has been found necessary, and in order to increase the resistance of the mechanism of the articulation member without decreasing its angular sensitivity, to make bearing plate articulation members of the type shown in FIGS. 3 and 4.

In FIGS. 3 and 4, the toothed ring 10 of the movable flange 11 still uses teeth of a very small angular pitch and for example of 2°, which can easily be obtained by a process which is perfectly known, such as a fine cutting process.

The toothing 12 of the bearing plates 13, 14, 15 has obviously the same pitch as the toothing of the ring 10, but the bearing plates 13, 14, 15 each have, at their rear parts, two angular sides 13a, 13b; 14a, 14b; 15a, 15b and are extended by guiding stems 13c, 14c, 15c enabling, when they are pulled back as in FIG. 3, to be self centered according to axis of their stems 13c, 14c, 15c in order to be ready to penetrate into the teeth of the ring 10. The guiding stems 13c, 14c, 15c have a width slightly smaller than the space between the sectors 16, 17, 18 which are similar to the sectors 8, 9, 10 of FIGS. 1 and 2 but comprise recessed portions 16a, 16b; 17a, 17b; 18a, 18b enabling to limit a rearward movement of the bearing plates 13, 14, 15. The corresponding play between the guiding stem and the sectors is equivalent to a lateral displacement by an angle of α/3 since, when the bearing plates 13, 14, 15 are pushed back in the toothing as in FIG. 4, they will be placed, according to the position of the toothed ring 10, either with an angle of 120°+⅔α (bearing plates 14 and 15), or with an angle of 120°−α/3 (bearing plates 13, 14, and 13, 15).

It is obvious that, according to the angular positions of the ring 10, the bearing plates 13, 14, 15 can bear by pair on one of the sectors 16, 17 or 18.

Therefore and as shown in FIG. 4, when upon effect of a control member which is typically a cam as in FIGS. 1 and 2, the bearing plates 13, 14, 15 are pushed back toward the periphery of the flange 11, and the toothings 12 of the bearing plates 13, 14, 15 will penetrate into the toothing 10 of the movable flange 11 with all, the teeth of the bearing plates 13, 14, 15 penetrating at tooth-bottom (see FIG. 4), the radial axis for the bearing plates 14, 15 will be shifted by +α/3 for the bearing plate 14 and by +α/3 for the bearing plate 15 (which is equivalent to positions at 120° corresponding to the toothing of the ring 11) in order that the sides of the guiding stems 14c, 15c of the bearing plates 14, 15 will bear on the two edges of the sector member 16 by thus locking without any play the back portion of the seat with respect to the seating portion of the seat.

As in the preceding embodiment of FIGS. 1 and 2, an angular displacement of α/3 can easily be obtained since it is the minimum angle which is chosen when the bearing plates 13, 14, 15 are shifted. In a lowering of the back portion in a rearward direction, the bearing plates 15 and 13 are the ones which are shifted against the side walls of the sector member 17 while the frontwardly pivoting of a back portion by ⅓ of the angle α causes an angular displacement of the bearing plates 13, 14 and their wedging against the side walls of the sector member 18.

Figure 5:
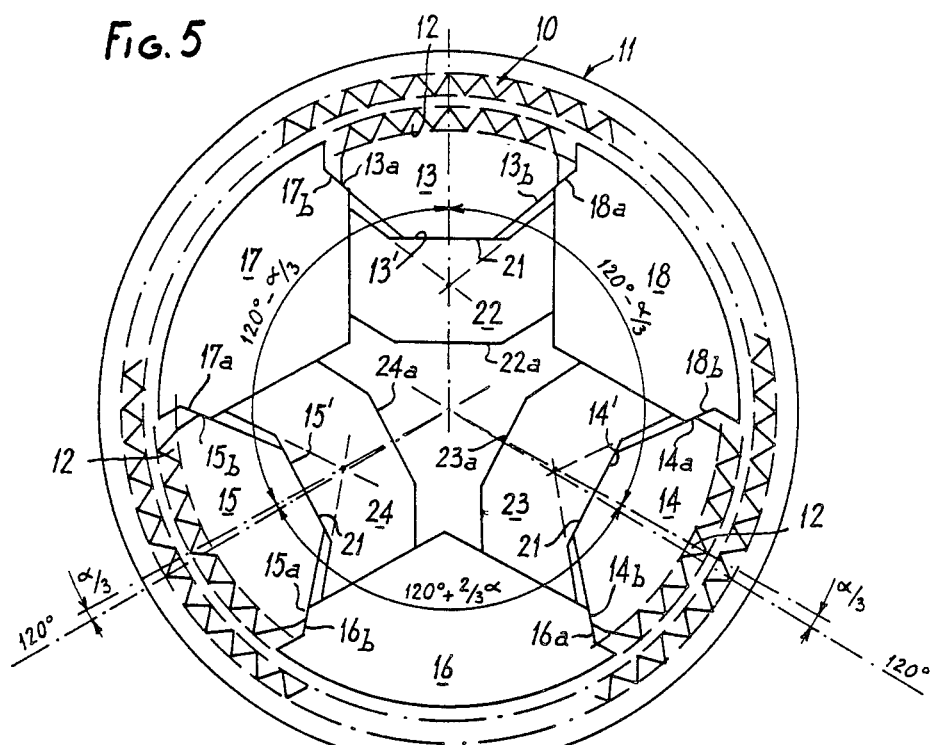
FIG. 5 is a view of a third embodiment of the invention, the bearing plates being disengaged from the fixed toothing ring and having a self centered guiding.
Figure 6:
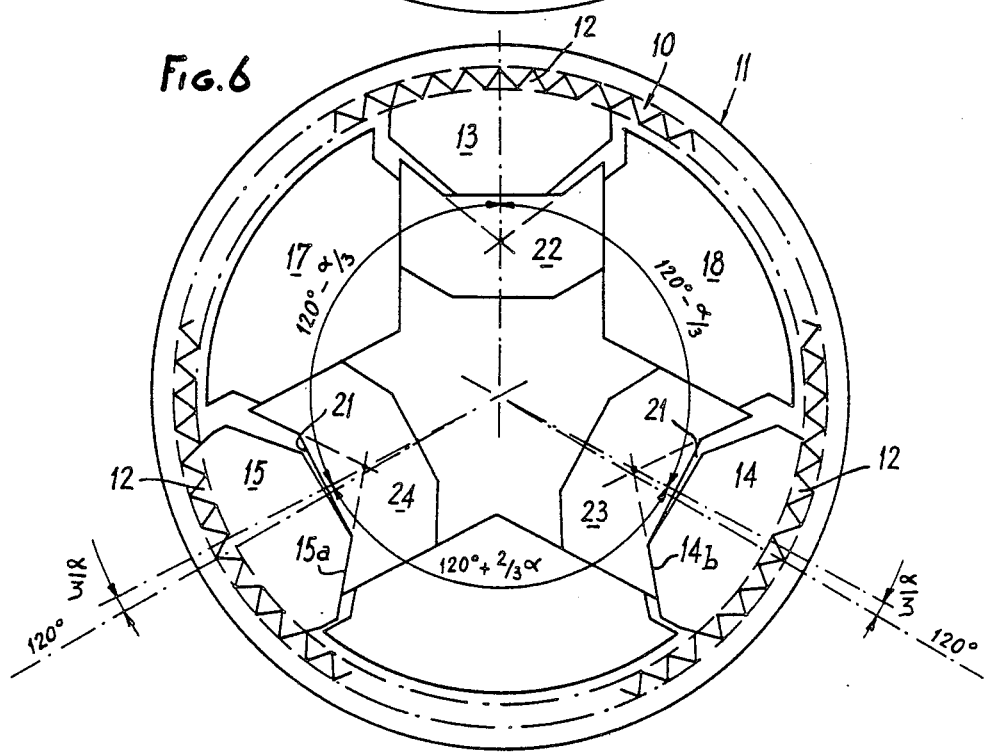
FIG. 6 is a view corresponding to that of FIG. 5 but with the bearing plates being shown engaged in the fixed toothed ring.

In FIGS. 5 and 6, the articulation member is identical to the articulation member described by reference to FIGS. 3 and 4, but the bearing plates 13, 14, 15 have a smaller height so that their lower parts have a plane surface 13', 14', 15' which will bear on the lower part of a substantially V-shaped disengagement 21 provided at the upper part of an intermediary part 22, 23, 24.

The intermediary parts 22, 23, 24 are into contact, by their lower areas 22a, 23a, 24a, with the control member which is typically a cam as in the preceding embodiments. In the unlocking position, which is when the bearing plates 13, 14, 15 are not into engagement with the toothed ring 10, the bearing plates 13, 14, 15 will occupy a position as shown in FIG. 5 while, when these bearing plates are placed in the locking position of the toothed ring 10, the teeth 12 of the bearing plates 13, 14, 15 are at tooth-bottom in the ring 10. However, the edges 14b, 15a of the bearing plates 14, 15 will bear upon the lateral sides of the V-shaped disengagement 21 of the intermediary parts 23, 24, by thus ensuring a wedging position for the bearing plates 13, 14, 15, as this has been explained hereinabove for the embodiment of FIGS. 3 and 4.

It is thus possible, by means of a small part which can be easily handled, to lock the bearing plates, and this can obviously be made in numerous positions since the minimum angular displacement is equal to $\alpha/3$ as explained in the above disclosure.

Finally, in FIGS. 7 and 8, there has been shown a complete articulation member having a central control shaft 25 carrying, in its chamfered part 25a, a cam 26 having three noses 26a, 26b, 26c provided to cooperate with the intermediary parts 22, 23, 24 of FIGS. 5 and 6 controlling the movement of the bearing plates 13, 14, 15 as this has been explained in the above disclosure. Moreover, the sector members 16, 17, 18 are so shaped for enabling, by their portions 27, a positioning of a spring 28 having, in a plan view, substantially the shape of a V and which tends to push back the cam 26 against the intermediary parts 22, 23, 24 in order to lock the teeth of the bearing plates at tooth-bottom of the toothed ring 10.

As this is shown in FIGS. 7 and 8, the bearing plates 13, 14, 15, when they are at tooth-bottom, will each distort a resilient return blade 29 in order that these bearing plates will easily be disengaged from the toothed ring 10 when the cam 26, having pivoted under action of the central control shaft 25, enables a disengagement by rotation of the noses 26a, 26b, 26c from the intermediary parts 22, 23, 24 by thus ensuring a disengagement of the back portion of the seat with respect to the seating portion of the seat.

In FIG. 8, the fixed flange 30, which carries fixation studs 31 for connecting it to the seating portion of a seat, maintains peripherally a circular ring 32 which guides the movable flange 11 by means of guiding stampings 33 which can be seen both in FIGS. 7 and 8. It should also be noted that the movable flange 11 carries fixation studs 34 enabling to connect it easily to the frame of the backing portion of a seat. This fixation is moreover perfectly known. The central shaft 25 has (see FIG. 8) a grooved end 25b for fixing a manual or motorized control element for the articulation member while the grooved end 25c of the central shaft 25 enables a connection, for example by means of a hollow shaft, between the two mechanisms of the articulation member placed on each side of the seat.

In some cases, it is also possible to demultiplicate the rotation speed of the central control shaft 25 by means of a reducing mechanism for ensuring a softer and more precise control of the articulation member.

We claim:

1. An articulation member for a back portion of a vehicle seat and similar applications comprising: three asymetrically guided sliding bearing plates having an upper toothing of a pitch $\alpha$; a fixed flange comprising three sectors for supporting said bearing plates; a movable flange having an inner toothing of a pitch $\alpha$, said pitch corresponding to the pitch $\alpha$ of the upper toothing of the bearing plates; elastic means for normally pushing back said bearing plates from the movable flange; said bearing plates being angularly shifted for two of said bearing plates and being submitted to a bias of control means, wherein the angular shift of said two of said bearing plates with respect to a third one is of $120° - \alpha/3$, whereby at least one of said bearing plates is at tooth-bottom in said inner thoothing while other bearing plates will bear at least in part on opposed surfaces of said inner toothing by thus ensuring a locking of the articulation member, and therefore of the backing portion of the seat with respect to the seating portion of said seat.

2. The articulation member as set forth in claim 1, wherein each of said bearing plates have guiding extension having an upper part with a widened area, the fixed flange being provided with sector members each having a recessed area, said widened areas cooperating with said recessed area.

3. The articulation member as set forth in claim 2, wherein said guiding extension has a lower part having a width smaller than an interval between two of said sector members by an angular measure substantially equal to $\alpha/3$.

4. The articulation member as set forth in claim 1, wherein said bearing plates have a lower restricted portion cooperating with intermediary parts having an upper V-shaped cut-out surface for enabling an engagement at a tooth-bottom of said three bearing plates in the inner toothing of said movable flange.

* * * * *

UNITED STATES PATENT AND TRADEMARK OFFICE
CERTIFICATE OF CORRECTION

PATENT NO. : 4,770,464
DATED : September 13, 1988
INVENTOR(S) : PIPON et al

It is certified that error appears in the above-identified patent and that said Letters Patent is hereby corrected as shown below: Title page:

IN THE ABSTRACT:

Line 11: change "αbeing" to read -- α being--.

IN THE SPECIFICATION:

Column 1, line 17: change "articulartion" to read --articulation
         line 42: insert a comma --,-- after "used";
         line 55: delete ", the";
         line 60: change "$\xi/3$" to read -- $\alpha/3$--;
Column 2, line 41: change "tooth" to read --toothed--;
Column 4, line 21: insert a comma --,-- after "11";
         line 22: delete the comma "," after "all".

Signed and Sealed this

Twenty-eighth Day of February, 1989

Attest:

DONALD J. QUIGG

Attesting Officer      Commissioner of Patents and Trademarks